US006176907B1

(12) United States Patent
Glausch

(10) Patent No.: US 6,176,907 B1
(45) Date of Patent: Jan. 23, 2001

(54) ANTI-CORROSION COATING MATERIAL

(75) Inventor: Ralf Glausch, Darmstadt (DE)

(73) Assignee: Merck Patent Gesellschaft mit beschrankter Haftung (DE)

( * ) Notice: Under 35 U.S.C. 154(b), the term of this patent shall be extended for 0 days.

(21) Appl. No.: 09/230,061

(22) PCT Filed: May 6, 1998

(86) PCT No.: PCT/EP98/02656

§ 371 Date: Jan. 19, 1999

§ 102(e) Date: Jan. 19, 1999

(87) PCT Pub. No.: WO98/53014

PCT Pub. Date: Nov. 26, 1998

(30) Foreign Application Priority Data

May 23, 1997 (DE) ............................................. 197 21 645

(51) Int. Cl.[7] ............................. C04B 9/02; C09D 5/08; C09B 67/00
(52) U.S. Cl. ..................... 106/14.44; 106/410; 106/493; 106/498; 106/472; 106/476; 252/389.1; 252/389.2; 252/389.52; 252/389.53; 252/394; 252/395; 252/396; 252/510
(58) Field of Search ................................... 106/14.44, 410, 106/493, 498, 472, 476; 252/389.1, 389.2, 389.52, 389.53, 394, 395, 396, 510

(56) References Cited

U.S. PATENT DOCUMENTS 5,735,939 * 4/1998 Glausch et al. .................... 106/14.44
5,749,946 * 5/1998 Glausch et al. .................... 106/14.17

FOREIGN PATENT DOCUMENTS

281427 * 8/1990 (DE) .
675173 * 3/1995 (EP) .
741171 * 4/1996 (EP) .

OTHER PUBLICATIONS

Derwent Publications Ltd., Week 9215, AN 115153, XP002075479, Abstract of German Patent Specification 295651 (Nov. 1991).

* cited by examiner

Primary Examiner—Anthony Green
(74) Attorney, Agent, or Firm—Millen, White, Zelano, & Branigan, P.C.

(57) ABSTRACT

Formulation for anti-corrosion coating materials, comprising
(i) 3–30% by mass of a monomeric and/or polymeric, metal-free or metal-containing, chelate-forming compound,
(ii) 10–80% by mass of a material which binds hydroxide ions, and
(iii) 5–65% by mass of a conductive pigment based on carbon.

20 Claims, No Drawings

ANTI-CORROSION COATING MATERIAL

The invention relates to a lead- and chromate-free formulation for anti-corrosion coating materials.

BACKGROUND OF THE INVENTION

Metallic articles can be protected against corrosion by covering them with a metallic, inorganic or organic protective coat. The organic protective coats, in particular, are provided with specific pigments and/or fillers in order to increase their corrosion protection capability. These additives include red lead, zinc chromate, zinc phosphate, talc, graphite and mica. Alternatively, it is possible to employ organic compounds as anti-corrosion pigments, alone or in combination with inorganic pigments and fillers. Examples of such organic compounds are benzidine phosphate, benzidine molybdate, benzidine hexacyanoferrate, organic phosphonic and arsonic acids and both aromatic and aliphatic carboxylic acids and their salts, such as benzoates and laurates.

Owing to their toxic and/or carcinogenic properties, the highly effective lead pigments and chromate pigments can no longer be used for corrosion protection. The pigments used to date in their place, zinc phosphate and zinc tetraborate, are of only low activity in comparison. Zinc salts initially require substrate corrosion, as for example, in the case of iron:

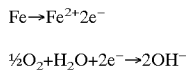

$Fe \rightarrow Fe^{2+} 2e^-$ $\frac{1}{2}O_2 + H_2O + 2e^- \rightarrow 2OH^-$ and are then intended to form basic complexes of low solubility with the OH⁻ ions formed. These complexes are intended to either adhere firmly to the substrate surface or to be precipitated into faults in an anti-corrosion primer and so plug these faults. A prerequisite for this is, firstly, that the corresponding zinc salt is present in an adequate pigment volume concentration and has not meanwhile been leached out owing to its solubility in water, and, secondly, that there are no other complexing species in the coating or in the adjacent corrosive medium. As a result, the zinc salt pigments frequently fail, and/or are markedly inferior in their action to the classical active pigments red lead and zinc chromate.

It is known from DD 281 427 that metal phthalocyanines show very good results as anti-corrosion pigments in coating materials on iron. They exert their effect both as pure pigment and in combination with a conductive carrier.

An improved formulation is the subject of EP 0 675 173, consisting of metal phthalocyanine, a conductive component, a component which binds hydroxide ions, and platelet-shaped pigments. A disadvantage of this combination is that the platelet-shaped pigment causes the coating material to be highly porous. The consequence is that the water which contaminates the coating has unhindered access to the metal surface, thereby accelerating the corrosion.

There is therefore a need for lead- and chromate-free pigment formulations which can be used for primer coats on corrosion-susceptible metals and which develop an anti-corrosion action which is equal to the protective effect of lead and chromate pigments.

SUMMARY OF THE INVENTION

The invention is based on the object of providing a formulation which can be incorporated into coating formulations based on customary binders and which, as a primer on a wide variety of metal substrates, especially on surfaces of ferrous materials, possesses anti-corrosion properties which are comparable with the protective effect of lead and chromate pigments. This pigment formulation is required to possess pronounced anti-corrosion properties not only under atmospheric exposure but also in aerated aqueous media.

This objective is achieved in accordance with the present invention by a formulation comprising
(i) 3–30% by mass of a monomeric and/or polymeric, metal-free or metal-containing chelate-forming compound of the general formula I or II,

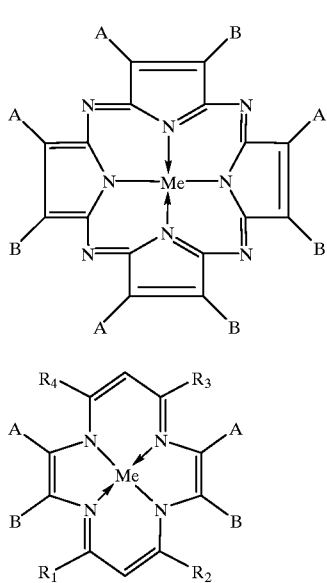

in which
A and B independently at each occurrence are an aromatic or cycloaliphatic radical which may also contain heteroatoms such as S, Se, O and N and also aryl, alkyl or halo groups or oxygen-, nitrogen- or sulfur-containing groups as additional substituents, $R^1$, $R^2$, $R^3$ and $R^4$ are H atoms or alkyl radicals, and Me is Cu, Fe, Ni, Co, Mn, Bi, Sn, Zn or $H_2$, (ii) 10–80% by mass of a material which binds hydroxide ions, and (iii) 5–65% by mass of a conductive pigment based on carbon.

Chelate complex compounds (i) employed are the above-mentioned compounds of the general formulae I and II, preferably phthalocyanines, tetraarylporphyrins and tetraazaannulenes. Among the phthalocyanines, preference is given to metal phthalocyanines and especially iron phthalocyanine. In the compounds I and II alkyl is preferably straight-chain or branched alkyl of 1–18 C atoms, in which one or more $CH_2$ groups can also be replaced by —CO—, —O—, —S—, —COO—, —O—CO— in such a way that no two O atoms are adjacent. Halogen is preferably bromine or chlorine.

The problem of high preparation costs caused by the metal phthalocyanine can be countered by applying this active component to conductive carrier materials, such as graphite, and thereby achieving an equal or even greater anti-corrosion effect with much less of the actual metal phthalocyanine active substance.

The chelate complex compounds are present in the formulation of the invention in a proportion of from 3 to 30% by mass, preferably from 15 to 25% by mass. The chelate complex compounds reduce oxygen, which, dissolved in water, penetrates by way of continuous pores and faults in the coating down to the metal substrate, and thereby passivate the exposed metal substrate. At the same time, the reduction of the oxygen produces hydroxide ions by the following equation:

$$O_2 + 2H_2O + 4e^- \rightarrow 4OH^-$$

These hydroxide ions are bound by component (ii) of the formulation of the invention.

As materials which bind hydroxide ions, (ii), it is preferred to employ phosphates, especially metaphosphates, bi- and triphosphates, silica gels, silicates, alumosilicates, calcite and all sparingly soluble metal salts which form sparingly soluble basic salts or complex compounds with $OH^-$ ions. Thus, for example, $Ca[SiO_3]$ takes up hydroxide ions to form $Ca_3(OH)_2[Si_4O_{10}]$.

It is also possible to use those compounds which at their surface form a buffer system which holds the pH of the adjacent aqueous medium in the range 6<pH<8.5, which is considered unhazardous for the elamination of organic coatings on steel substrates:

$$R-COO^- + H_2O \rightleftharpoons R-COOH + OH^-$$

Preference is given to the use of calcium metaphosphate, which binds the hydroxide ions formed when the oxygen is reduced.

The material that binds hydroxide ions is present in the formulation of the invention in a proportion of from 10 to 80% by mass, preferably 40 to 60% by mass.

In a further embodiment, the formulation of the invention additionally comprises from 5 to 65% by mass, preferably from 15 to 55% by mass, of a conductive pigment based on carbon. Either the conductive pigment consists of a carrier material which is covered with a conductive, carbon-containing coat, or the pigment is formed by the conductive material alone, such as, for example, in the case of carbon black, graphite or fluorine-doped graphite. Suitable carrier materials are mica, barium sulfate, glass flakes, silica or titanium dioxide.

Suitable conductive coats are carbon-containing metal oxide coats. The conductive pigments preferably have a particle size <30 μm, the particle morphology being unimportant. The conductive pigments are preferably platelet-shaped or spherical. In the formulation of the invention, the conductive pigment may also comprise a mixture of two or more different pigments.

The conductive pigment goes further towards ensuring the electronic conductivity of the formulation of the invention, which is required for the catalysed reduction of oxygen.

The binding of the hydroxide ions that are produced in the course of oxygen reduction prevents the delamination of the coating from the metal substrate, so that there is no subfilm corrosion (in the case of ferrous materials, underrusting).

The formulation of the invention is prepared from the individual components using the machinery customary in the pigments and coatings industry, such as sand mills or bead mills, ball mills and roll mills, in the milled fineness that meets the practical requirements, and is dispersed in coating formulations based on customary binders. Alternatively, the individual components can be dispersed in succession in the binder. Such binders are alkyd resins, poly-urethanes, chlorinated rubbers or melamine resins, which are present in an amount of from 35 to 55% by mass in the coating formulations.

In addition, the coating formulation may include all customary auxiliaries and fillers. Mention may be made here, in particular, of siccatives, dispersants, levelling agents, anti-settling agents, coupling agents or thixotropic agents. In addition, solvents may also be present in the formulation, in a proportion of from 10 to 20% by mass. In this context, the solvent must be expertly matched to the particular binder. Customary solvents are butyl acetates, xylenes and paraffinic hydrocarbon mixtures in the boiling range from 120 to 180° C.

The formulation of the invention is employed for coating formulations that are applied as a primer to a very wide variety of metal substrates, especially to surfaces of ferrous materials. The primer, once formation of a film is complete, is notable for pronounced anti-corrosion properties under atmospheric exposure or on exposure to aerated aqueous media.

The formulation of the invention meets every requirement with respect to anti-corrosion properties.

It impairs neither the levelling nor the film-forming properties of the coating material but leads instead to a uniform and particularly ageing-resistant coat which adheres firmly to metal substrates and has a high barrier action; moreover it does not restrict the overpaintability of the resulting primer for the construction of multicoat systems, and in particular is able to passivate the metal substrate on exposure to aqueous media, in pores or in faults in a coating that have come about through mechanical influences, and hence to prevent subfilm corrosion (in the case of ferrous materials, underrusting).

A further advantage of the formulation of the invention is that it can be used even in coating formulations comprising zinc phosphate, and the primers produced therewith are markedly superior in their anti-corrosion properties even to those pigmented with zinc chromate.

The examples which follow are intended to illustrate the invention but without restricting it.

EXAMPLE 1

| | |
|---|---|
| Iron phthalocyanine | 6.3% by mass |
| Graphite | 9.4% by mass |
| Ca m-phosphate | 12.6% by mass |
| Zinc phosphate (hopeite) | 6.3% by mass |
| Resin solution 60% in xylene (air- and heat-drying short-oil alkyd resin) | 48.8% by mass |
| Butyl acetate/xylene = 3:1 | 15.1% by mass |
| Siccatives and auxiliaries: Manganese octoate (BP Chemicals) | 1.5% by mass |

EXAMPLE 2

| | |
|---|---|
| Iron phthalocyanine | 4.4% by mass |
| Carbon black (Printex L, Degussa) | 4.4% by mass |
| Ca m-phosphate | |
| Zn m-phosphate | 17.5% by mass |
| Resin solution, 60% in xylene (air- and heat-drying short-oil alkyd resin) | 8.7% by mass |
| | 48.7% by mass |
| Butyl acetate + Shellsol D (hydrocarbon mixture) | 14.6% by mass |
| Siccatives and auxiliaries: Byk 410 from Byk, FRG | 1.7% by mass |

EXAMPLE 3

| | |
|---|---|
| Iron phthalocyanine | 6.05% by mass |
| Fluorine-doped graphite | 8.06% by mass |
| Ca m-phosphate | 15.09% by mass |
| Zinc white | 6.05% by mass |
| Resin solution as in Example 1 | 47.82% by mass |
| Butyl acetate/xylene = 3:1 | 14.36% by mass |
| Siccatives and auxiliaries: | 1.57% by mass |
| Mischtrockner [mixed drier] 1D (synthetic isocarboxylic acid salts of lead and cobalt) from Gebrüder Borchers, Düsseldorf, FRG | |

COMPARITIVE EXAMPLE 1

| | |
|---|---|
| Zinc phosphate | 7.20% by mass |
| Zinc white (zinc oxide) | 11.63% by mass |
| Microtalc N | 6.19% by mass |
| Bayferrox 140 (red iron oxide) | 13.36% by mass |
| Blanc fixe (BaSO$_4$ from Sachtleben) | 6.19% by mass |
| Resin solution as in Example 1 | 41.64% by mass |
| Butyl acetate/xylene = 3:1 | 12.50% by mass |
| Siccatives and auxiliaries: | 1.29% by mass |
| Soligen cobalt 6 (naphthenic acid) from Gebrüder Borchers, Düsseldorf, FRG | |

COMPARATIVE EXAMPLE 2

| | |
|---|---|
| Zinc yellow (zinc chromate) | 7.63% by mass |
| Zinc white | 11.63% by mass |
| Microtalc AT1 | 6.19% by mass |
| Bayferrox 140 | 13.36% by mass |
| Blanc fixe | 6.19% by mass |
| Resin solution as in Example 1 | 42.21% by mass |
| Butyl acetate/xylene = 3:1 | 12.50% by mass |
| Siccatives and auxiliaries: | 1.29% by mass |
| Barium Siccatol from Abshagen, Hamburg, FRG | |

COMPARITIVE EXAMPLE 3 (Example 5 of EP 0 675 173)

| | |
|---|---|
| Iron phthalocyanine | 7.13% by mass |
| Minatec 30 CM (TiO$_2$/mica + SiO$_2$ + (Sb,Sn)$_2$O from Merck KGaA, FRG | 7.14% by mass |
| Mica | 3.56% by mass |
| Ca m-phosphate | 14.26% by mass |
| Zinc phosphate | 7.10% by mass |
| Resin solution Plexigum PM 685 (Acrylic resin in xylene from Jäger, FRG) | 42.47% by mass |
| Shellsol A/xylene | 17.51% by mass |
| Siccatives and auxiliaries: | 0.83% by mass |
| Aco barium octoate from Abshagen, Hamburg, FRG | |

The formulations of the invention are incorporated into binder systems by mixing and dispersing techniques customary in the coatings industry, the particle fineness being below 20 μm. The diluents appropriate for the particular binder give the coating materials with the formulations of the invention the viscosity required for processing. These diluents, normally involving butyl acetate, xylene and paraffinic hydrocarbons in the boiling range from 120 to 180° C., can be found by the skilled worker in Karsten's Lackrohstofftabellen [Tables of coatings raw materials], published by Vincentz-Verlag. Three coating materials were prepared in this way and were used to coat metal sample panels consisting of ordinary produced steel. These sample panels are subjected to the following tests, and compared at the same time with three reference systems: a coating comprising zinc phosphate, one comprising zinc chromate, and the closest prior art (Example 5 of EP 0 675 173):

Results of the corrosion protection tests a) Outdoor exposure in accordance with DIN 53166

After an outdoor storage period of twelve months, the scribe mark in the samples coated by reference system I or II is surrounded closely by small blisters over an extent of from 2 to 3 mm, whereas no blistering has yet occurred in any of the coatings comprising the pigment combinations of the invention.

b) MACHU test

Alternating exposure by 8 h of immersion in a solution of 50 g of NaCl, 10 ml of glacial acetic acid, 5 g of 30% hydrogen peroxide solution per litre of distilled water (fresh daily) at 40° C. and 16 h of exposure in dry air at room temperature per cycle.

The parameters set were the degree of blistering of the coatings, in accordance with DIN 53209, and the corroded area as a proportion of the total surface area, after the coating had been detached following 8 cycles of exposure:

| Coating | Degree of Blistering | Proportion of Corroded Area in % |
|---|---|---|
| Reference system I | m$^3$/g$^3$ | 42 |
| Reference system II | m$^4$/g$^4$ | 60 |
| Reference system III | m$^1$/g$^1$ | 5 |
| Example 1 | 0/0 | <1 |
| Example 2 | 0/0 | <1 |
| Example 3 | m$^1$/g$^1$ | <1 | c) Alternating climatic test in accordance with VDA [German Carmakers Association] 621–415

After 9 cycles of alternating climatic exposure, the 3 reference systems show scribe underrusting of up to 3 mm in places, whereas the occurrence of this process cannot yet be definitely ascertained on the samples in accordance with the invention (<1 mm).

The results show that the protective coatings produced on surfaces of ferrous materials using the formulations of the invention produce much better protection against corrosion than the reference systems.

EXAMPLE 4 a) A coating produced on aluminium and hot dip-galvanized steel substrate with a formulation according to Example 1 (two coats with an overall coat thickness of 80 μm), after 12 months of outdoor weathering in accordance with DIN 53166, shows no blistering or delamination phenomena either in the vicinity of the scribe or on the remainder of the sample surface. The good adhesion is demonstrated by testing in accordance with the tearing method:

|  | Example 1 | Comparative Example 3 |
|---|---|---|
| - without exposure to water | 8–10 | 4–7 MPa |
| - after 9 h of continuous immersion in distilled water | 7–14 | 5–12 MPa | with fracture taking place predominantly not at the phase boundary between substrate and coating but within the coating itself (cohesive fracture).

Coating materials comprising the pigment formulations of the invention are, consequently, employable not only for ferrous materials but also, given the choice of an appropriate binder, for other corroding metals as well, for the purpose of effective corrosion prevention b) Permeation of water through the coating film (porosity)

|  | Example 1 | Comparative Example 3 |
|---|---|---|
| - without exposure to water | $3.5 \cdot 10^{-6}$ | $0.9 \cdot 10^{-6}$ |
| - after 9 h of continuous immersion in distilled water | 4.5 | $1.7 \cdot 10^{-6}$ |
| - free coating film $6 \cdot 10^{-6}$ (alkyd resin system) in $g \cdot d^{-1} \cdot cm^{-1}$ | | |

What is claimed is:

1. Formulation for anti-corrosion coating materials, comprising:
   (i) 3–30% by mass of a monomeric and/or polymeric, metal-free or metal containing chelate-forming compound of the general formula I or II,

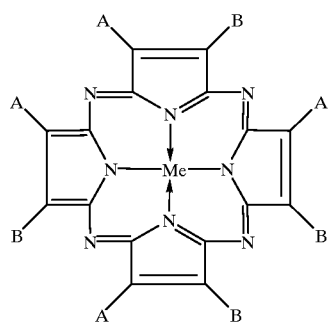

I

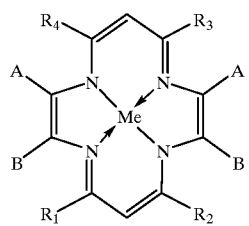

II in which

A and B independently at each occurrence are an aromatic or cycloaliphatic radical which may also contain heteroatoms in the ring, and also aryl, alkyl or halo groups or oxygen-, nitrogen- or sulfur containing groups as additional substituents, $R^1$, $R^2$, $R^3$ and $R^4$ are H atoms or alkyl radicals and Me is Cu, Fe, Ni, Co, Mn, Bi, Zn or $H_2$, (ii) 10–80% by mass of a material which binds hydroxide ions, and
   (iii) 5–65% by mass of a conductive pigment based on carbon, provided that it contains no platelet-shaped pigments.

2. Formulations according to claim 1, wherein the chelate-forming compound is a phthalocyanine.

3. Formulations according to claim 2, wherein the phatalocyanine is a metal phthalocyanine.

4. Formulations according to claim 2, wherein the phatalocyanine is a iron phthalocyanine.

5. Formulations according to claim 2, wherein the metal phthalocyanine has been applied to a conductive carrier.

6. Formulations according to claim 1, wherein the conductive pigment is carbon black, graphite or fluorine-doped graphite.

7. Formulations according to claim 1, wherein the material which binds hydroxide ions is a phosphate.

8. Anti-corrosion coating material comprising a formulation according to claim 1.

9. Formulations according to claim 1, wherein the material which binds hydroxide ions is a metalphosphate, bi-phosphate, or triphosphate.

10. Formulations according to claim 1, wherein the material which binds hydroxide ions is a silica gel, silicate, alumosilicate or calcite.

11. Formulations according to claim 1, wherein the material which binds hydroxide ions is a calcium metalphosphate.

12. Formulations according to claim 1, wherein the material which binds hydroxide ions constitutes from 40 to 60% by mass of the formulation.

13. Formulations according to claim 1, wherein the conductive pigment based on carbon constitutes from 15 to 55% by mass of the formulation.

14. Formulations according to claim 1, wherein the conductive pigment based on carbon is a mixture of two or more different pigments.

15. Formulations according to claim 1, wherein the material which binds hydroxide ions is a sparingly soluble metal salt which forms a sparingly soluble basic salt or complex compound with OH— ions.

16. A coating composition for a ferrous material comprising a formulation according to claim 1.

17. Formulations according to claim 1, where the heteroatoms in A or B are S, Se, O or N.

18. Formulations according to claim 1, wherein the formulation is lead-free and chromate-free.

19. Formulations according to claim 1, which do not contain any platelet-shaped material.

20. Formulations according to claim 1, which do not contain mica.

* * * * *